V. G. APPLE.
GEARING.
APPLICATION FILED MAR. 4, 1912.
1,079,090.
Patented Nov. 18, 1913.
2 SHEETS—SHEET 1.
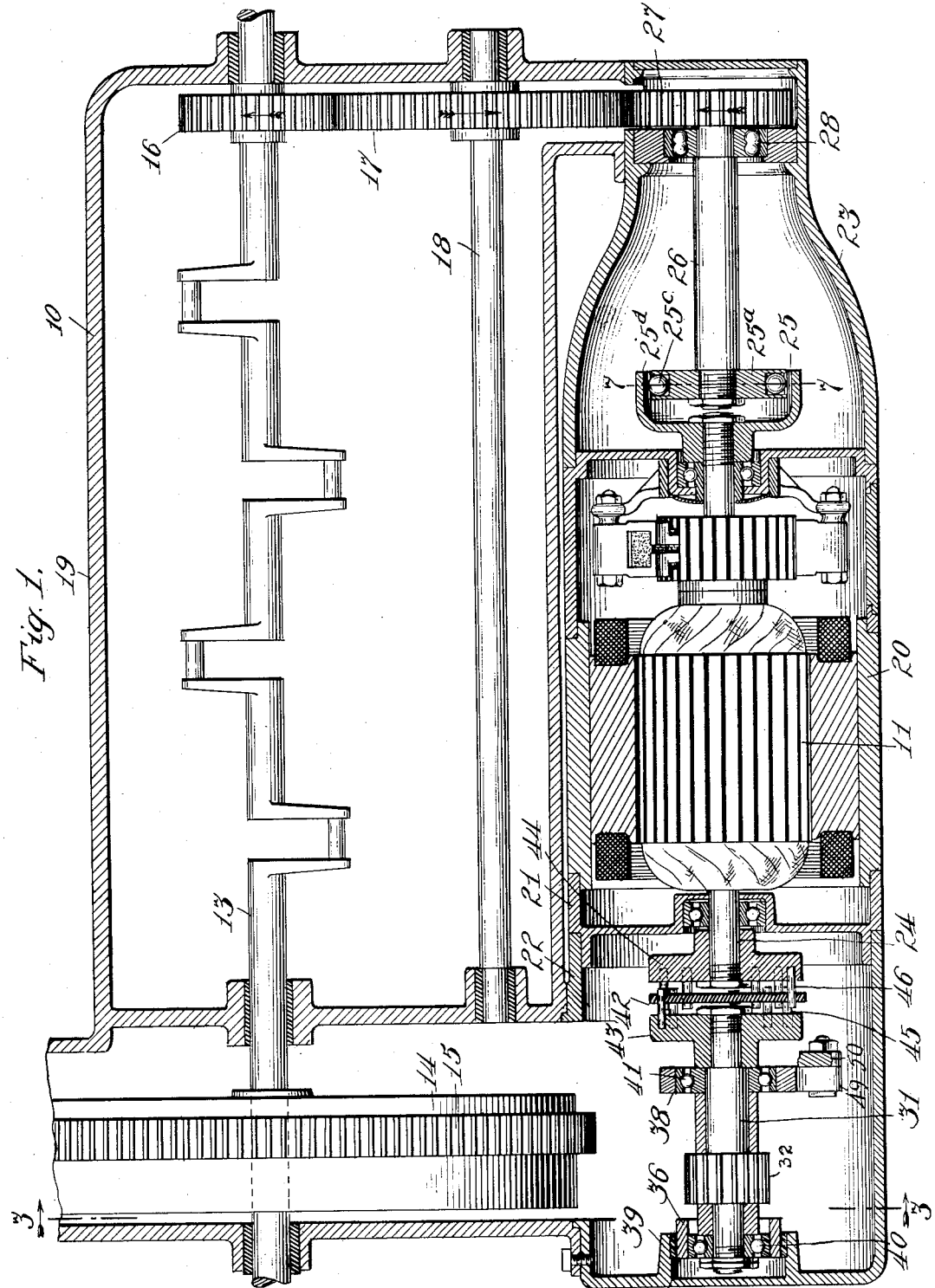
Witnesses:
Milton Lenoir
L. B. Graham
Inventor
Vincent G. Apple
By Forée Bain May
his Attorneys

V. G. APPLE.
GEARING.
APPLICATION FILED MAR. 4, 1912.

1,079,090.

Patented Nov. 18, 1913.

2 SHEETS—SHEET 2.

Witnesses:—
Milton Lenoir
L. B. Graham

Inventor:
Vincent G Apple
By Forée Bain & May
his Attorneys.

UNITED STATES PATENT OFFICE.

VINCENT G. APPLE, OF DAYTON, OHIO, ASSIGNOR TO THE APPLE ELECTRIC COMPANY, OF DAYTON, OHIO, A CORPORATION OF OHIO.

GEARING.

1,079,090. Specification of Letters Patent. Patented Nov. 18, 1913.

Application filed March 4, 1912. Serial No. 681,536.

*To all whom it may concern:*

Be it known that I, VINCENT G. APPLE, a citizen of the United States, residing at Dayton, in the county of Montgomery and State of Ohio, have invented certain new and useful Improvements in Gearing, of which the following is a specification.

My invention relates to improvements in gearing especially adapted for power installations for motor vehicles and the like and has particular reference to the interrelation of an internal combustion engine and a dynamo which acts as an electric motor to drive the engine in starting the latter, and as a generator driven by the engine when the latter is in self-impelled operation.

Figure 5:
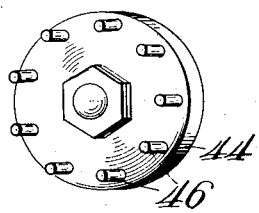
Figure 6:
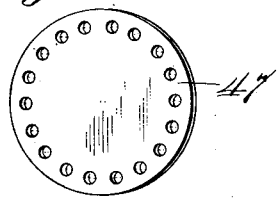
Figure 7:
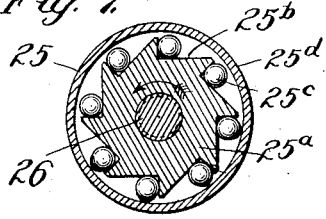
Figure 4:
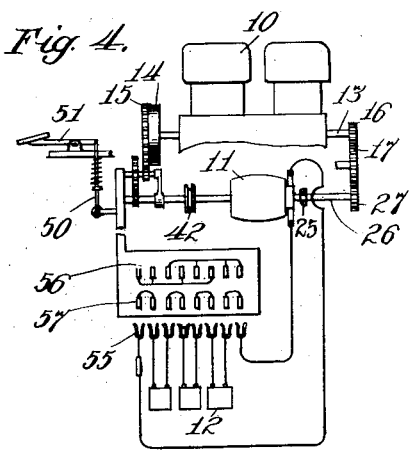
Figure 2:
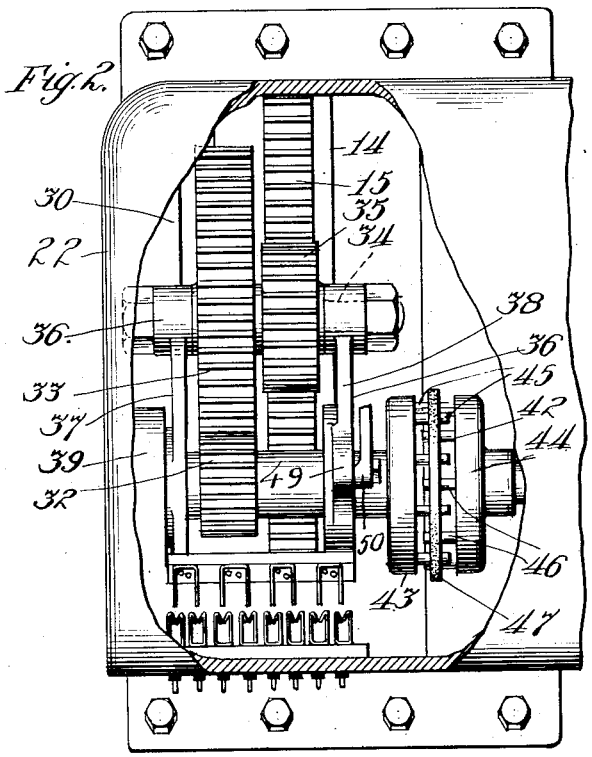
Figure 3:
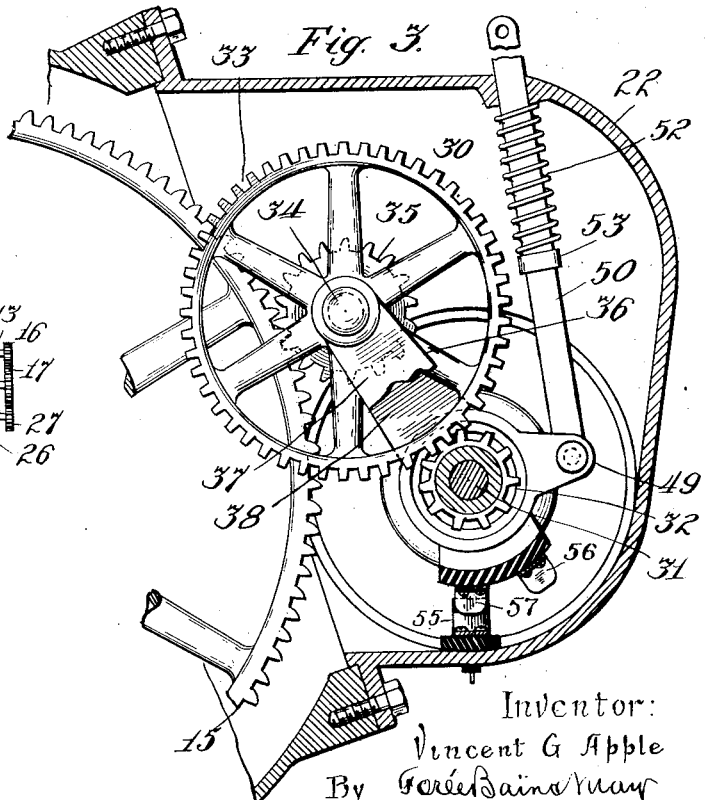

In the drawings wherein I have shown an embodiment of my invention, Figure 1 is a horizontal section through the crank case of the gas engine and the electric power unit; Fig. 2 is a side elevation (from the right of Fig. 1) of one end of the starting appliance with parts broken away; Fig. 3 is a vertical section on line 3—3 of Fig. 1; Fig. 4 is a diagrammatic illustration of the system; Figs. 5 and 6 are details of a connection joint; and Fig. 7 is a detail of a clutch.

The dynamo is preferably arranged in a horizontal position, associated with the engine crank case, said dynamo having automatic power connections with the engine crank shaft in order to receive power from said shaft in order that the dynamo may be driven rapidly as a generator when the engine is in self-impelled operation and having also means for manual operation through a reducing gear to connect the dynamo to the engine shaft so that the dynamo, operating as a motor, may drive the engine at slow speed for starting, the arrangement being preferably such that the last said connection is automatically broken as the engine speeds up in its self-impelled operation.

In the drawings, (referring particularly to Fig. 4 for diagrammatic indication of the system) 10 indicates the gas engine, such as the engine in an automobile, and 11 an electric dynamo associated with the storage batteries 12 through a suitable switch so that the dynamo, running as a generator, may charge the batteries (preferably connected in parallel) or, operated as a motor, may receive current therefrom (preferably connected in series). The present invention provides an economical and simple construction whereby said dynamo 11, through the operation of an automatic clutch may be driven from the engine shaft as a generator when the engine is self-impelled, or, through mechanical connection manually effected by the operation of a treadle lever, may serve as a driving motor to operate the engine crank shaft as in starting the engine.

In the construction specifically shown the engine shaft 13 carries at one end a fly wheel 14 provided with a gear 15 upon its periphery and upon the opposite end of the crank shaft is a pinion 16 meshing with the gear 17 upon the cam shaft 18. This is a common form of construction but, so far as the present invention is concerned, it typifies merely two power transmission gears upon the crank shaft. In conformity with usual construction it is preferable that the structure thus far described be inclosed in a housing or casing 19, having side openings opposite the gears 15 and 17 to admit in engagement therewith the appropriate elements of the dynamo gearing.

Dynamo 11 and its gearing members are preferably housed in a casing structure 20 which may be conveniently made in three separable sections, a central section 21 inclosing the dynamo proper; a reduction-gear-containing head 22 having a side opening alining with the fly wheel opening of casing 19, and a clutch-containing-head 23 having a side opening alining with the cam-shaft-gear opening in the crank casing 19. These casing parts are connected together and are secured to crank case 19 in suitable fashion, which of course may vary in specifically different installations.

The central dynamo casing 21 preferably has bearing heads at both of its ends to afford bearing for the dynamo shaft 24, said shaft projecting beyond said bearings at both ends. One end of the dynamo shaft, which for distinction I will call the forward end, is susceptible of automatic connection through a clutch 25, with an extension shaft 26 which bears upon its end a pinion 27 constantly meshing with the gear 17, said gear 17 in this respect acting like an idler so that extension shaft 26 rotates in the same direction as the engine crank shaft 13. The automatic clutch 25 is preferably of the rolling wedge type for operation in one direction only, there being provided, in the specific embodiment shown, a disk 25ª upon the shaft 26, said disk having peripheral tapering pockets 25ᵇ containing rolling wedge members, as balls 25ᶜ, working in proximity to the inner face of a cup member 25ᵈ mounted upon the dynamo shaft 24, the arrangement of the parts being such that when the shaft 26 tends to rotate faster than the shaft 24 the clutch will operate to connect the two shafts, while when shaft 24 tends to turn more rapidly than the shaft 26 the clutch will be released. As a matter of convenience in construction shaft 26 may be provided with a single bearing within the casing close to the gear wheel 27, the bearing, shown at 28, being a ball bearing in which the outer ball race is parti-spherical so that the shaft 26 may be self alining with the shaft 24.

It will be obvious that when the engine is running at high speed under its own power the shaft 26 will be driven at high speed and will therefore be connected through the clutch 25 to operate the dynamo, which under such circumstances will act as a generator.

Within the reduction gear head 22 I provide a reduction gear driven from the dynamo shaft and having a shiftable element capable of connection with or disconnection from fly wheel gear 15. In the specific construction shown the reduction gear, generally indicated as 30, comprises a shaft 31 bearing a pinion 32 meshing with the large gear 33 mounted upon a shaft 34 in common with a pinion 35 adapted to mesh with fly wheel gear 15, the shaft 34 being mounted for rocking movement coaxially with the shaft 31 so that the pinion 35 may be thrown into or out of mesh with the fly wheel gear 15, gear wheel 32 taking a planetary motion with respect to connecting pinion 32. To this end shaft 34 is mounted in a rocker frame 36, comprising arms 37 and 38. The arm 37 finds bearing in a boss 39 upon the end member of head 22, said arm 37 being internally fitted with a ball bearing 40 for the shaft 31. The other arm 38 has a ball bearing 41 upon the shaft 31, and the inner end of said shaft has connection through a joint 42, with the dynamo shaft 24. This joint 42 I prefer shall be of such nature as to permit of slight universal motion for self alinement of shaft 31 with shaft 24, the specific construction shown comprising two heads 43 and 44 upon the two shafts 31 and 24, each of these heads having projecting therefrom toward the opposite head a series of pins as shown in 45 and 46, said pins being placed in staggered relation and engaging in appropriate holes in a leather disk 47, which forms a connection slightly yielding universally.

Operating means mechanically controllable by an operator are provided for rocking the rocker frame 36 into position to throw the gear 35 into mesh with fly wheel gear 15. Thus arm 38 may be provided with a lug 49 engaged by a link 50 extending through the top wall of the casing head 22, and engaged by an elevating lever 51 which may conveniently take the form of a foot pedal when the device is applied to an automobile. As the free end of the lever 51 is depressed link 50 is raised, rocking the carrying frame 36 so the pinion 35 is engaged with the gear 15.

The construction preferably is such that when the gear 15 takes on a rapid rotation,—as when the engine "picks up",—the pinion 35 is automatically thrown out of engagement therewith, and as one available means to this end I show the gear teeth of the gear 15 and pinion 35 as cut with proper gear faces on one side and cam faces on the opposite side, so that while the pinion 35 may readily drive gear 15 acceleration of gear 15 will cause the cam surfaces of the gear teeth to throw the pinion 35 out of engagement therewith, such movement being augmented by action of a spring 52 interposed between the top of the casing member 22 and an abutment 53 on link 50 and tending normally to hold the rocking frame in such position as to disengage the pinion 35 from gear 15.

It is preferable with the equipment above described that the storage batteries 12 provided in connection with the dynamo to drive the same as a motor shall be connected in series when driving the dynamo as a motor and connected parallel when receiving current from the dynamo acting as a generator. In order that the appropriate change in the circuit of the batteries in respect to the dynamo may be automatically effected I provide upon the rocking frame 36 two sets of movable switch contacts 56 and 57 coöperating with the set of contacts 55 fixed upon the casing 22. As indicated in Fig. 4 the stationary contacts 55 may be respectively connected to the battery terminals and to the dynamo terminals while the movable contacts of the respective sets are so interconnected that set 57 (which coöperates with the stationary contacts 55 when the engine is being started) connects the batteries 12 in series in the dynamo circuit, while the set 56 (normally standing engaged with the stationary contacts 55) connects the batteries in parallel in such dynamo circuit. Manifestly the batteries may be used for any ordinary purposes of lighting or ignition service in connection with the automobile, but such connections form no part of my present invention.

The operation of the device above described is as follows: Assuming the engine to be at rest, it may be started by operating the dynamo as a motor and connecting the dynamo shaft with the engine shaft through the reduction gear. To this end the lever 51 is depressed, rocking the frame 36 to throw the pinion 35 into engagement with the fly wheel gear 15, such operation also throwing movable contact set 57 into connection with stationary contact set 55. Thus the dynamo receives current from the storage batteries 12 connected in series therewith and, running as a motor, drives the reduction gear which is in positive connection with the fly wheel until the engine " picks up " and begins its self-impelled operation. As soon as this action occurs in the engine the speed of the gear 15 is of course increased far beyond that at which the pinion 35 of the reduction gear tends to drive it and consequently the cam surfaces of the fly wheel gear teeth automatically throw the pinion 35 out of engagement therewith, whereupon the operator releases the lever 51 so that the spring 52 may oscillate the rocking frame 36 back to normal position throwing the movable contact set 56 into connection with the stationary contacts 55 and connecting the batteries in parallel with the generator.

Under the conditions first described where the dynamo is working as a motor the clutch 25 is idle, as the dynamo shaft tends to run at greater speed than extension shaft 26, but when the engine picks up the shaft 26 is driven rapidly in rotation through the gearing connections to the engine shaft and thereupon the clutch 25 acts to communicate driving power from the shaft 26 to the dynamo shaft 24, thereby to drive the dynamo as a generator.

While I have herein described in some detail a specific embodiment of my invention, well adapted for the purpose of equipping automobiles of a now common type, it will be apparent to those skilled in the art that many changes in details of construction might be made without departure from the spirit of my invention and within the scope of the appended claims.

What I claim is:

1. The combination of a dynamo casing providing bearings for the oppositely extending shaft ends of a dynamo, an engine shaft, a dynamo shaft, manually operable means to connect said engine shaft with one end of the dynamo shaft, and automatically operable means to connect said engine shaft with the other end of the dynamo shaft.

2. The combination of a dynamo casing providing journal bearings at its ends for the oppositely extending ends of a dynamo shaft, an engine shaft, a dynamo shaft, reduction gear means adapted for connecting one end of said dynamo shaft to the engine shaft to drive the engine shaft from the dynamo shaft, gearing adapted to connect the engine shaft to the other end of the dynamo shaft to drive the latter, mechanical means to effect said reduction gear connection, and automatic means to release the reduction gear connections with the engine " picks up " and effect the other connections between the engine shaft and the dynamo shaft.

3. The combination, with a dynamo shaft, and an engine shaft, of reduction gear means manually controllable for effecting connections between one end of the dynamo shaft and the engine shaft, an extension shaft for the dynamo, gearing connections between said extension shaft and the engine shaft, and automatic clutch means for connecting said extension shaft and the dynamo shaft.

4. The combination, with a dynamo shaft and an engine shaft, of reduction gearing means manually controllable for effecting driving connection between said shafts, and other connections between said shafts including automatic clutch means operable upon rotation of the engine shaft above the speed at which it may be driven by the dynamo shaft through said reduction gearing means, to connect said dynamo shaft in driven relation to the engine shaft.

5. The combination, with a dynamo shaft, and an engine shaft, of automatic speed-responsive means to connect the dynamo shaft to be driven by the engine shaft, and means to connect said dynamo shaft to drive the engine shaft, including a manually shiftable member, and a controlling means operable by said member.

6. The combination with engine shaft, and a dynamo shaft, manually operable means to connect said dynamo shaft to drive the engine shaft at reduced speed, an extension shaft for connection with the dynamo shaft, gearing connections between said engine shaft and said extension shaft constantly to drive said extension shaft from said engine shaft and automatic means for effecting connection between said extension shaft and said dynamo shaft when the speed of rotation of the extension shaft begins to exceed that of the dynamo shaft.

7. The combination of an engine shaft, a dynamo shaft, a reduction gearing adapted to make driving connection from the dynamo shaft to the engine shaft, manually operable means for effectuating such connection when the speed of rotation of the dynamo shaft is suitably in excess of that of the engine shaft, and means automatically to disable such connection when the engine shaft speeds up beyond the rate at which it may be driven by the dynamo through such reduction gear.

8. The combination with an engine shaft having cranks, and two gears upon said shaft oppositely beyond the cranks, a dynamo shaft connectible at opposite ends to said gears on the engine shaft, connecting means at one end of the dynamo shaft including a reduction gearing manually connectible to one said engine shaft gear to drive the engine shaft at low speed and automatically disconnectible when the engine shaft attains predetermined speed, and connecting means for the opposite end of the said dynamo shaft to be driven from the other gear on the engine shaft when the engine shaft is running at a relatively rapid rate.

9. The combination of an engine shaft having cranks and two gears, a crank case therefor, a dynamo housing secured to said crank case, providing a central dynamo containing portion and separable head portions therebeyond, a reduction gearing within one said head portion for effecting driving connection from the dynamo shaft to one engine shaft gear, and automatic clutch means within the other head portion automatically to effect driving connection from the other engine gear to the dynamo shaft whereby the engine shaft may drive the dynamo shaft when the engine is in self impelled operation.

10. The combination with an engine crank shaft, and a crank case, of a dynamo casing mounted on said crank case and having openings for communication therewith at separated points, gear wheels on said crank shaft adjacent said points of communication between the casings, a dynamo shaft journaled in the dynamo casing, a reduction gearing manually operable to effect connection between the dynamo shaft and one crank shaft gear through one said opening for communication between the casings, and gearing connection between said dynamo shaft and the other crank shaft gear through the other opening for communication between the casings, the last said means of connection including an automatic speed-responsive clutch.

11. The combination with an engine crank shaft, a cam shaft, gearing connections between said crank shaft and said cam shaft, and a fly wheel on the crank shaft provided with a gear, of a dynamo shaft, a reduction gear associated with such shaft, manually operable to effect driving connection from the dynamo shaft to the fly wheel gear of the engine, and another means for connecting the engine shaft in driving relation to the dynamo shaft, said means comprising a gearing connection with the cam shaft gear and an automatic speed responsive-clutch.

12. A device of the character described comprising a casing, a motor-generator, a shaft and an extension shaft therein, a reduction gearing within one end of said casing, and an automatic speed responsive clutch between the extension shaft and the generator shaft.

13. A device of the character described comprising a casing for a dynamo, a reduction gearing within said casing, comprising a shaft, a pinion on said shaft, a rocking frame rotatable relative to said shaft, and reduction gearing members carried by said rocking frame and adapted to receive power from said shaft gear and to apply power from a pinion carried by said rocking frame.

14. A device of the character described comprising a casing for a motor generator and a reduction gearing comprising a driving pinion within said casing and a reduction gearing in the casing comprising a shaft, a pinion on said shaft, a rocking frame rotatable relative to said shaft, and reduction gearing members carried by said rocking frame adapted to receive power from said shaft gear to communicate power from a pinion carried by said rocking frame.

15. A device of the character described comprising a casing for a dynamo, a reduction gearing in the casing comprising a shaft, a pinion on said shaft, a rocking frame rotating relative to said shaft, and reduction gear members carried by said rocking frame adapted to receive power from said shaft gear to communicate power from a pinion carried by said rocking frame.

16. A device of the character described comprising a casing for a dynamo, a reduction gearing including a driving pinion, a rocking frame carrying said driving pinion, said driving pinion having teeth shaped on one side to present appropriate driving surfaces, and on the other side to present non-driving cam surfaces.

17. A device of the character described comprising a casing, divided into three longitudinal separate parts, the central whereof is adapted to receive a dynamo having projecting shaft ends, a reduction gearing contained within one end part of said casing, means to connect the reduction gear shaft to the projecting end of the dynamo shaft, an extension shaft within the opposite end part of the casing, a gear on said extension shaft, and automatic speed responsive clutch means for connecting said extension shaft with the opposite projecting end of the dynamo shaft.

18. A device of the character described comprising a casing, divided into three longitudinal separate parts, the central whereof is adapted to receive a dynamo having projecting shaft ends, a reduction gearing contained within one end part of said casing, a universal joint to connect the reduction gear shaft to the projecting end of the dynamo shaft, an extension shaft within the opposite end part of the casing, a gear on said extension shaft, and rolling wedge clutch means for connecting said extension shaft with the opposite projecting end of the dynamo shaft.

In testimony whereof I hereunto set my hand in the presence of two witnesses.

VINCENT G. APPLE.

In the presence of—
E. M. EARNHART,
N. E. SNYDER.